(12) United States Patent
Hsieh et al.

(10) Patent No.: US 8,366,306 B2
(45) Date of Patent: Feb. 5, 2013

(54) COMPUTER ENCLOSURE

(75) Inventors: Kun-Chi Hsieh, Tu-Cheng (TW); Li Tong, Shenzhen (CN); Jun-Zhi Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 156 days.

(21) Appl. No.: 13/095,862

(22) Filed: Apr. 28, 2011

(65) Prior Publication Data

US 2012/0075881 A1     Mar. 29, 2012

(30) Foreign Application Priority Data

Sep. 23, 2010   (CN) .......................... 2010 1 0289406

(51) Int. Cl.
  *F21V 7/04*       (2006.01)
(52) U.S. Cl. .......... 362/555; 362/85; 362/253; 361/806; 361/837

(58) Field of Classification Search .................. 361/805, 361/837; 362/85, 551, 555
See application file for complete search history.

(56) References Cited

U.S. PATENT DOCUMENTS

| | | | |
|---|---|---|---|
| 5,455,743 A * | 10/1995 | Miyajima | 361/781 |
| 6,275,387 B1 * | 8/2001 | Liao et al. | 361/806 |
| 7,342,494 B2 * | 3/2008 | Maloney | 340/568.1 |
| 7,813,136 B2 * | 10/2010 | Liu | 361/727 |

* cited by examiner

*Primary Examiner* — Ali Alavi
(74) *Attorney, Agent, or Firm* — Altis Law Group, Inc.

(57) ABSTRACT

A computer enclosure includes a front panel, a switch module, and a light guide module. The switch module is attached to the front panel and includes a mounting bracket, a switch member attached to the mounting bracket, and a light emitting diode (LED) attached to the mounting bracket. The light guide module is attached to the front panel and has a light guide slot and a first transparent board covering the light guide slot. The LED is configured to generate light that enters in the light guide slot and propagates out from the first transparent board.

19 Claims, 8 Drawing Sheets

COMPUTER ENCLOSURE

BACKGROUND

1. Technical Field

The present disclosure relates to computer enclosures, more particularly to a computer enclosure with a light guide module.

2. Description of Related Art

Computer enclosures usually include a front panel, a switch button attached to the front panel, and a light emitting diode (LED) attached to the front panel. The switch button includes a transparent portion. The LED is located behind the transparent portion. After the switch button is pressed to power on the computer, the LED is powered on and emits light via the transparent portion of the switch button to indicate that the computer is powered on. However, light emitted from the LED can just emit from the switch button. The indicating effect is not very obvious.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
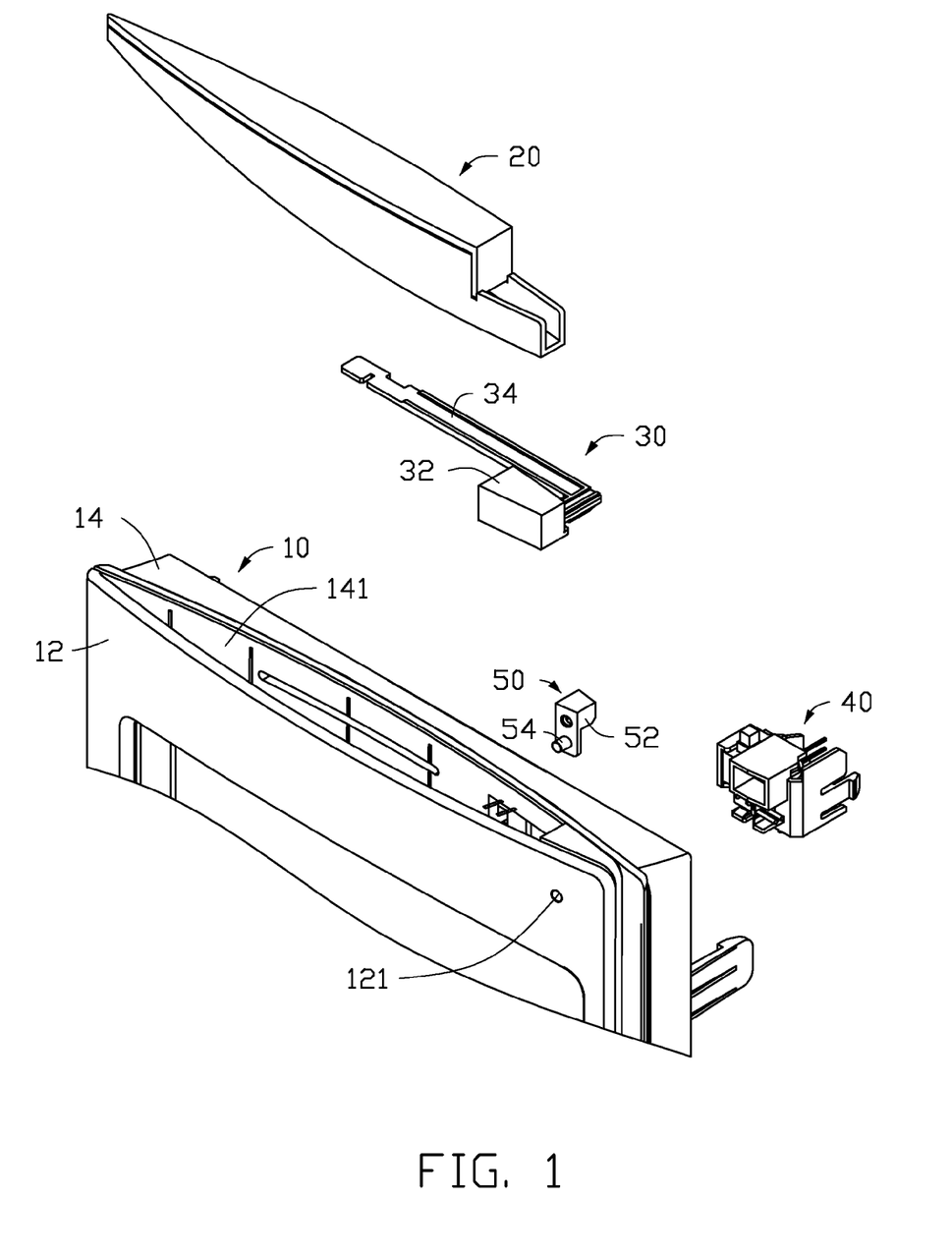
FIG. 1 is an exploded view of a computer enclosure according to an embodiment.
Figure 2:
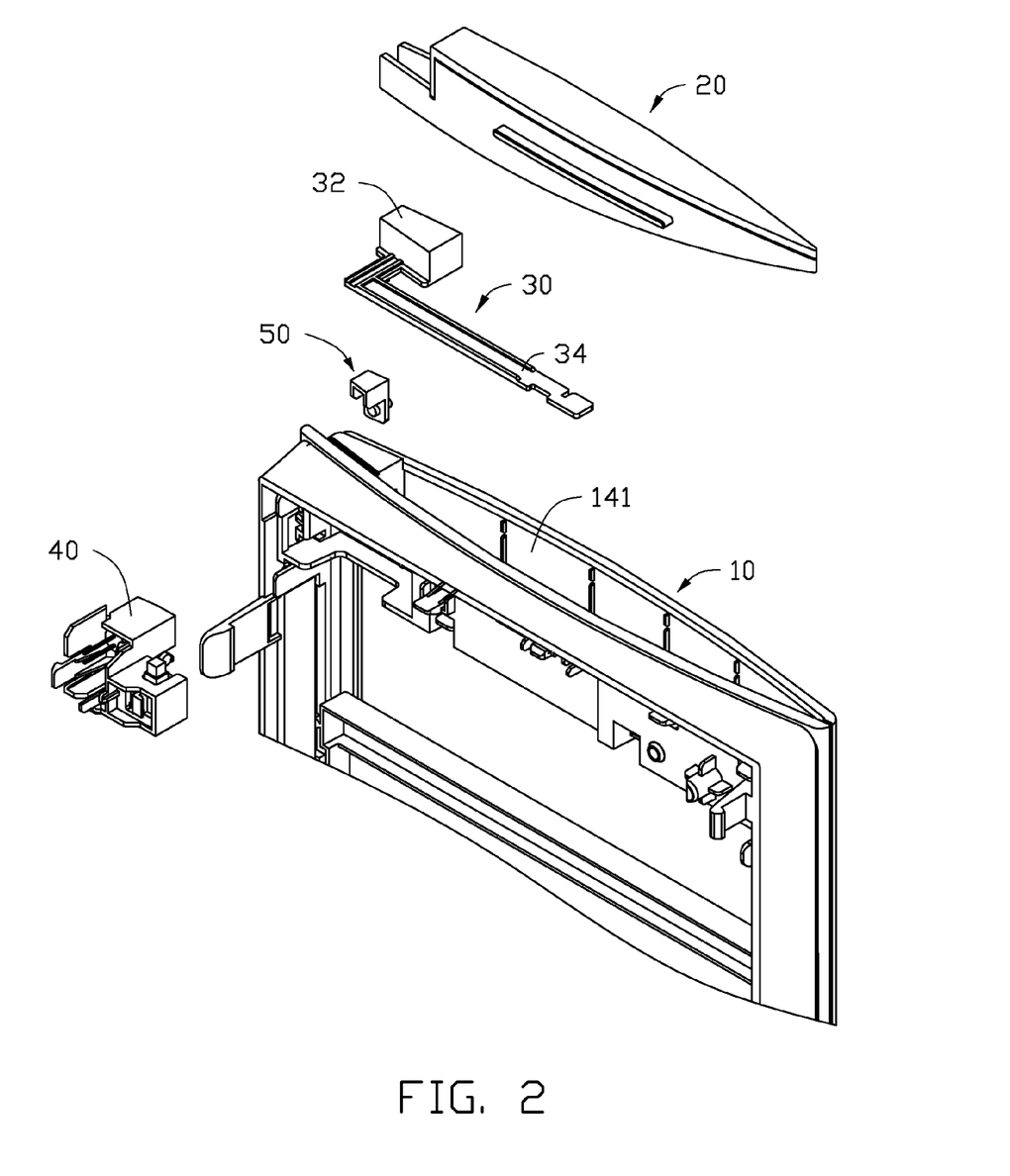
FIG. 2 is similar to FIG. 1, but viewed from another aspect.

Referring to FIGS. 1 and 2, an embodiment of a computer enclosure includes a front panel 10, a light guide module 20, a pressable member 30, a switch module 40, and a transparent member 50. The front panel 10 includes a front plate 12 and a top flange 14 connected to the front plate 12. A mounting hole 121 is defined in the front plate 12. An elongate holding slot 141 is defined in the top flange 14. The pressable member 30 includes a pressing portion 32 and an L-shaped resilient arm 34 connected to the pressing portion 32. The transparent member 50 includes an L-shaped main portion 52 and a transparent post 54 protruding from the main portion 52.

Figure 3:
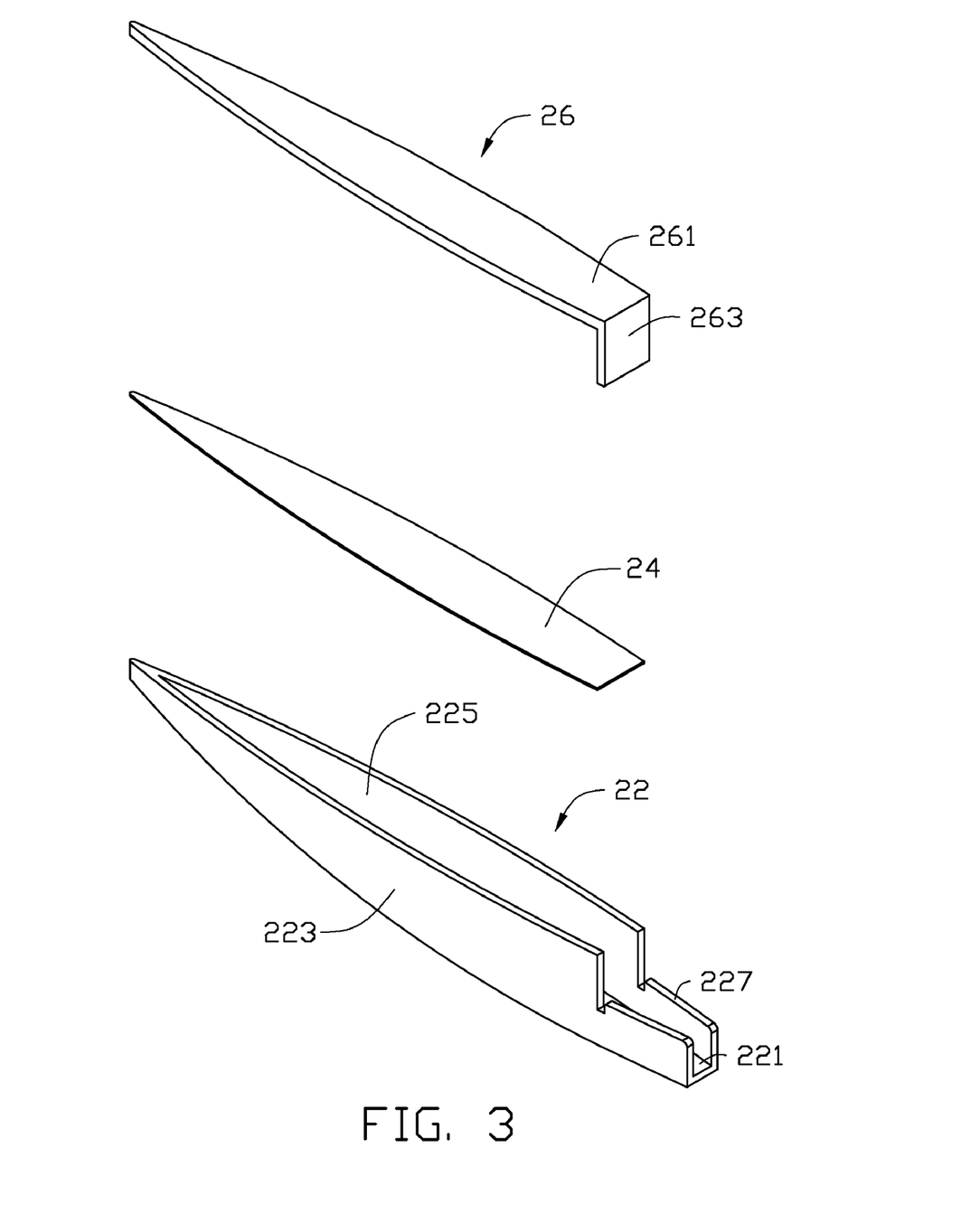
FIG. 3 is an exploded view of a light conduct module of FIG. 1.

Referring to FIG. 3, the light guide module 20 includes a main shell 22, a first transparent board 24, and a second transparent board 26. The main shell 22 includes a base plate 221 and a pair of side plates 223 connected to opposite sides of the base plate 221. The main shell 22 has a closed end and an open end opposite to the closed end. A light guide slot 225 is formed between the side plates 223. An L-shaped gap 227 is defined in each of the side plates 223 at the open end. The first transparent board 24 is configured to cover an upper opening of the light guide slot 225. The second transparent board 26 includes a main plate 261 and a flange 263 extending perpendicularly and downwards from the main plate 261. A shape and size of the main plate 261 is the same as that of the first transparent board 24. In assembly of the light guide module 20, the first transparent board 24 is attached on top edges of the side plates 223 and covers the upper opening of the main shell 22. The main plate 261 abuts the first transparent board 24. The flanges 263 abut vertical edges of the gaps 227.

Figure 4:
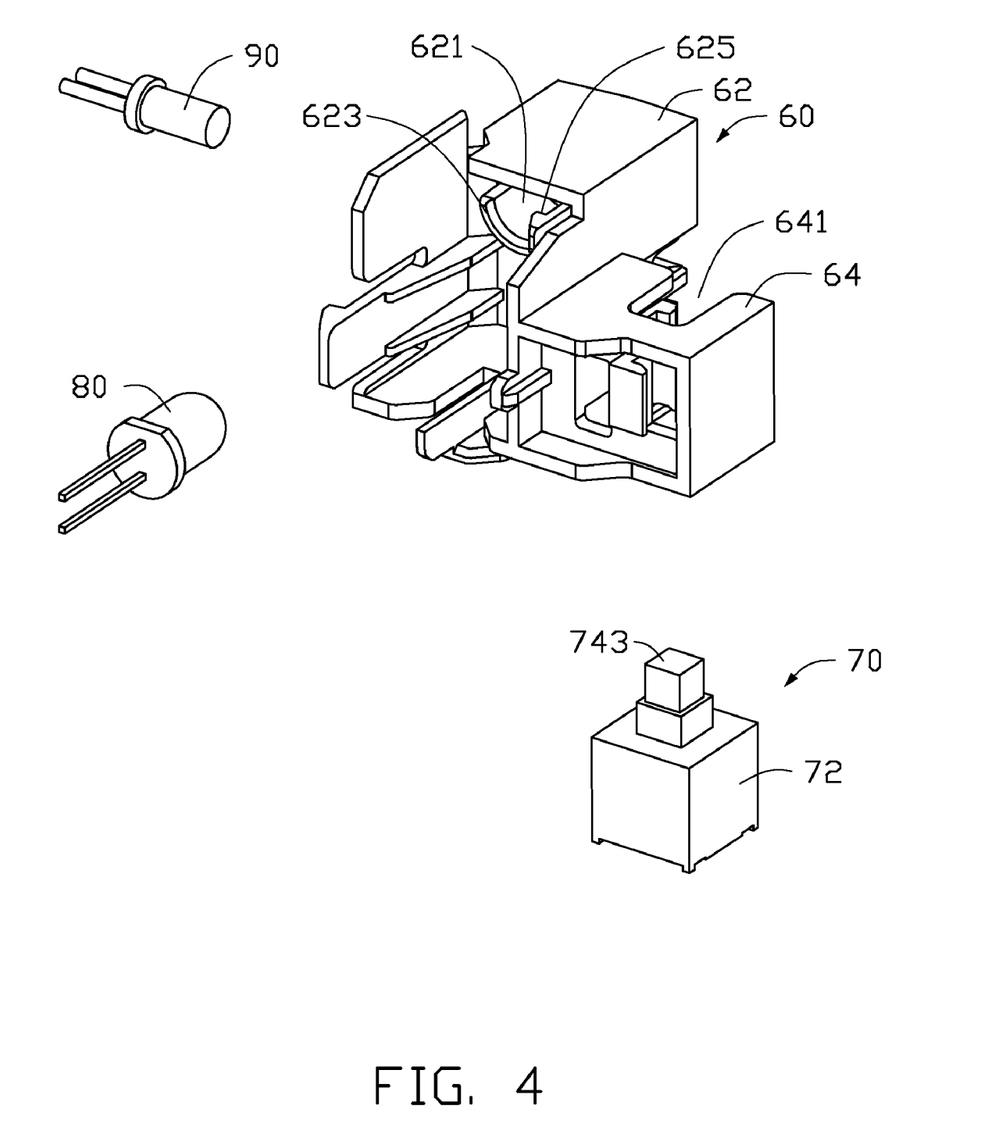
FIG. 4 is an exploded view of a switch module of FIG. 1.
Figure 5:
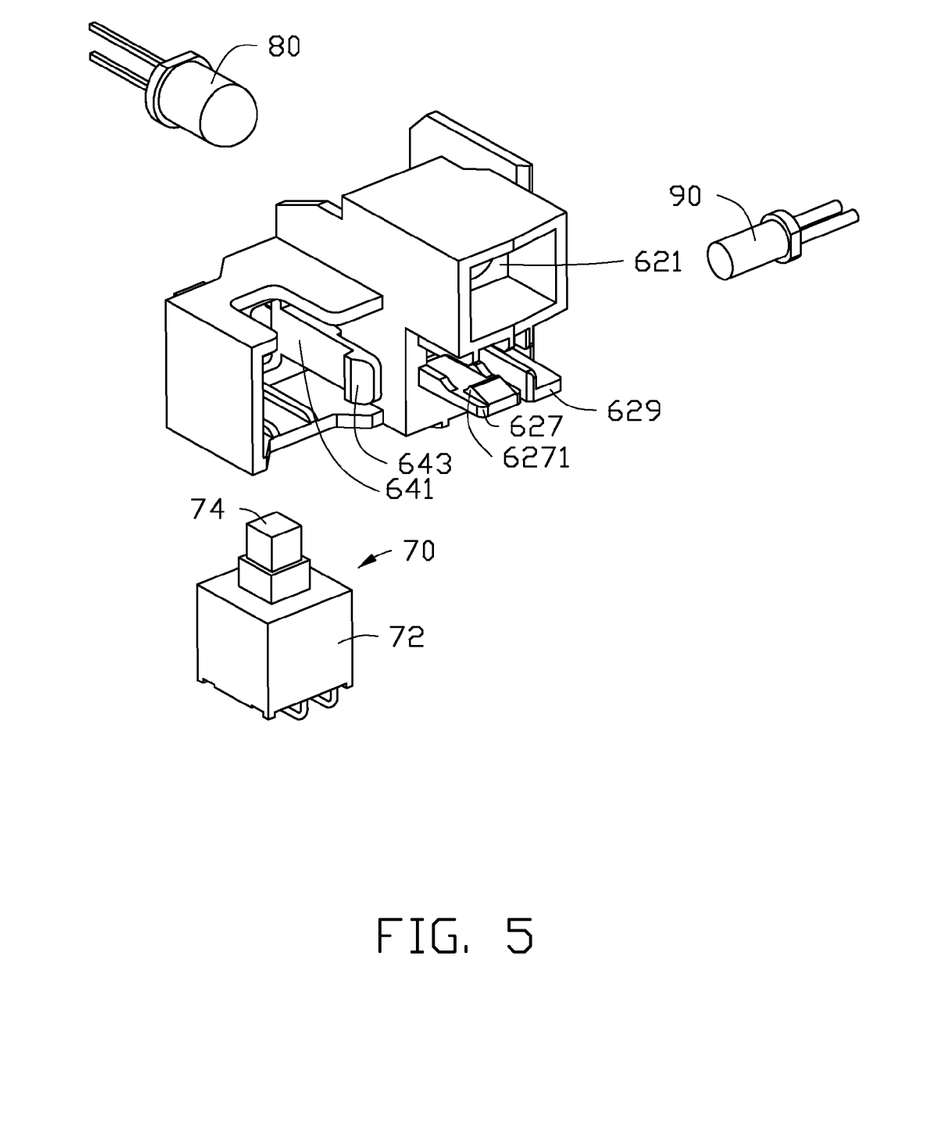
FIG. 5 is similar to FIG. 4, but viewed from another aspect.

Referring to FIGS. 4 and 5, the switch module 40 includes a mounting bracket 60, a switch member 70, a first LED 80, and a second LED 90. The mounting bracket 60 includes a first portion 62 configured for mounting the first LED 80 and the second LED 90, and a second portion 64 configured for mounting the switch member 70. The first portion 62 and the second portion 64 are jointed side by side. A height of the first portion 62 is greater than that of the second portion 64. A first mounting slot 621 is defined in the first portion 62 for accommodating the first LED 80. An arc-shaped holding piece 623 protrudes from an edge of the first mounting slot 621 towards a rear side of the first portion 62. A first hook piece 625 protrudes from the rear side and is located adjacent to the first mounting slot 621. The mounting bracket 60 further includes a first support piece 627 and a second support piece 629 protruding from a front side of the mounting bracket 60 (See FIG. 5). A wedge-shaped protrusion 6271 is formed on a distal end of the first support piece 627. A second mounting slot 641 is defined in the second portion 64. A second hook piece 643 extends from the second portion 64 towards the front side. The switch member 70 includes a main body 72 and a switch button 74 attached to the main body 72.

Figure 6:
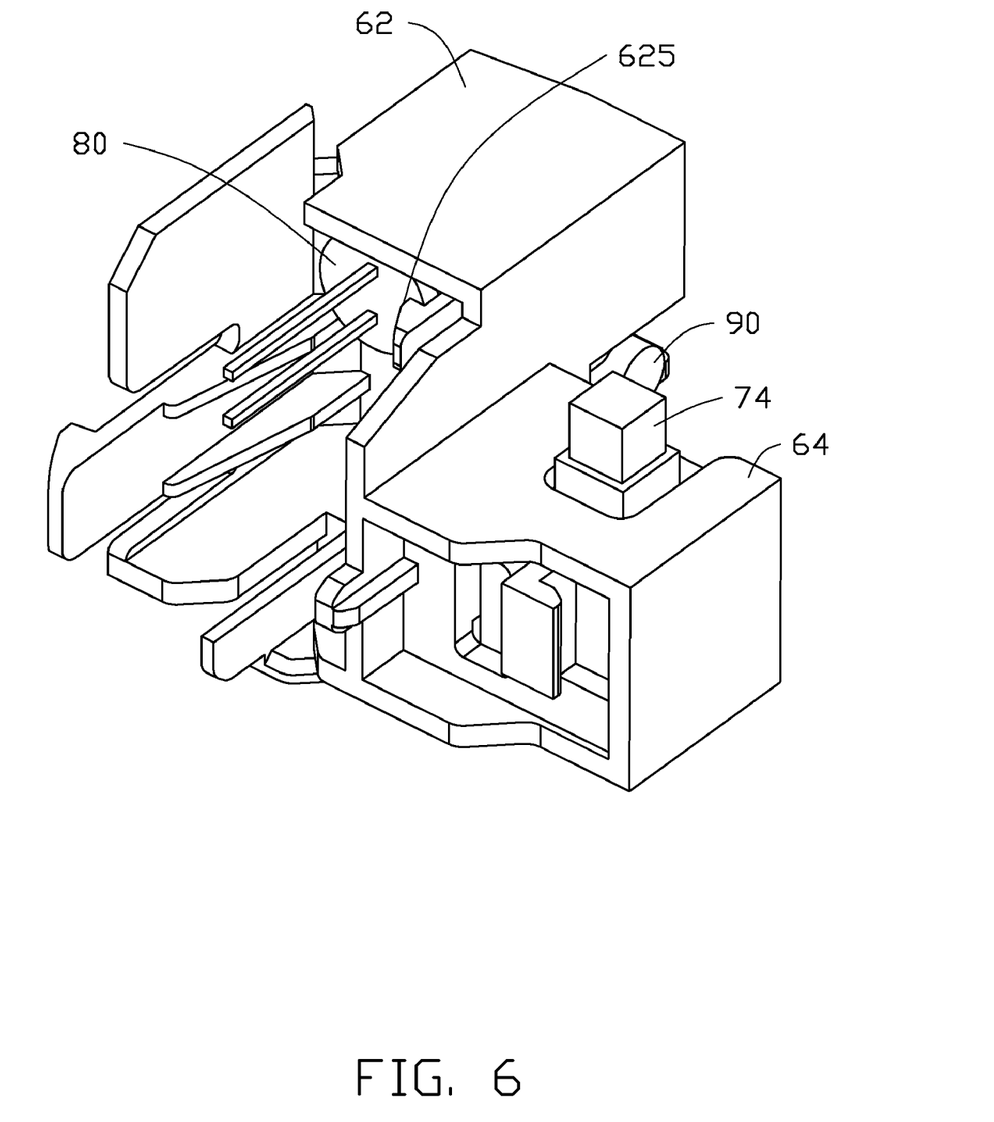
FIG. 6 is an assembled view of FIG. 4.
Figure 7:
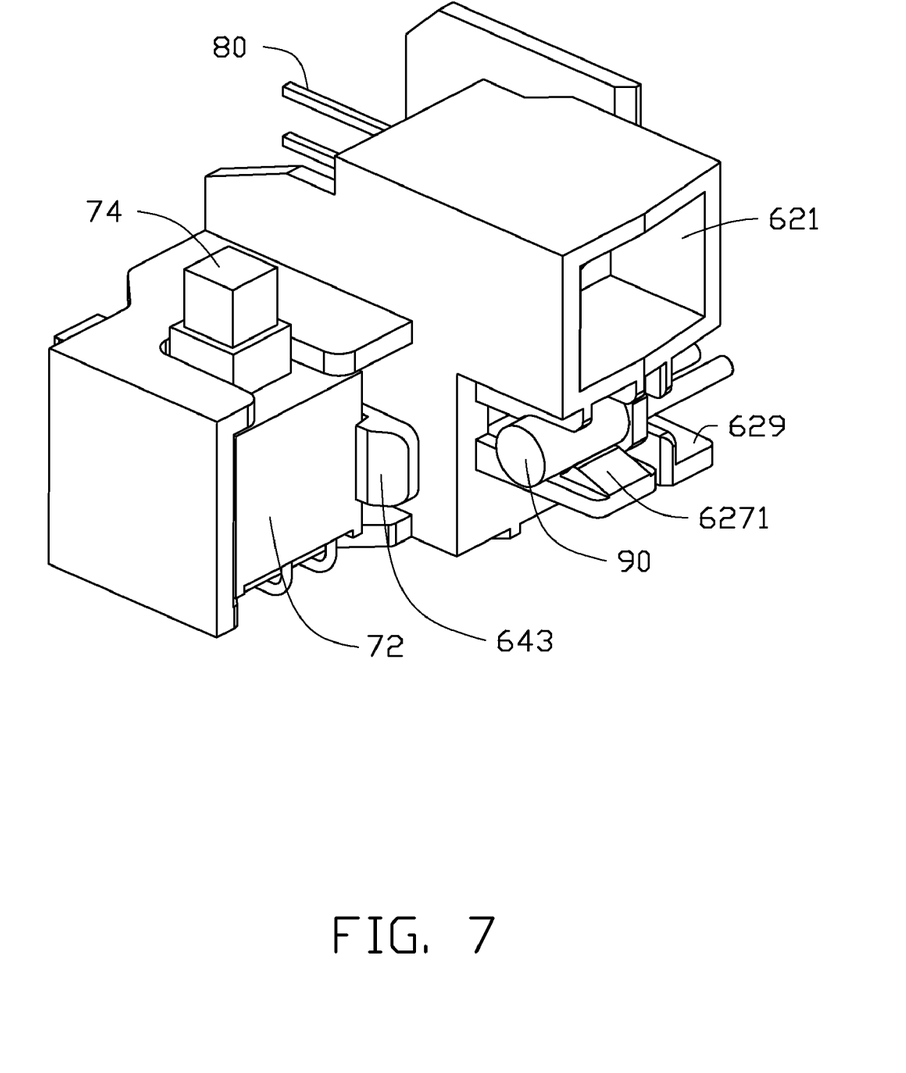
FIG. 7 is an assembled view of FIG. 5.

Referring to FIGS. 6 and 7, in assembly of the switch module 40, the main body 72 is mounted in the second mounting slot 641. The second hook piece 643 clasps the main body 72 to secure the switch member 70 in the second mounting slot 641. The switch button 74 extends through a top gap of the second portion 64. The first LED 80 is mounted in the first mounting slot 621 and supported by the holding piece 623. The first hook piece 625 clasps a rear side of the first LED 80 to secure the first LED 80 in the first mounting slot 621. The second LED 90 is held by the first support piece 627 and the second support piece 629. The wedge-shaped protrusion 6271 abuts the second LED 90 and prevents the second LED 90 from sliding off the mounting bracket 60 (see FIG. 7).

Figure 8:
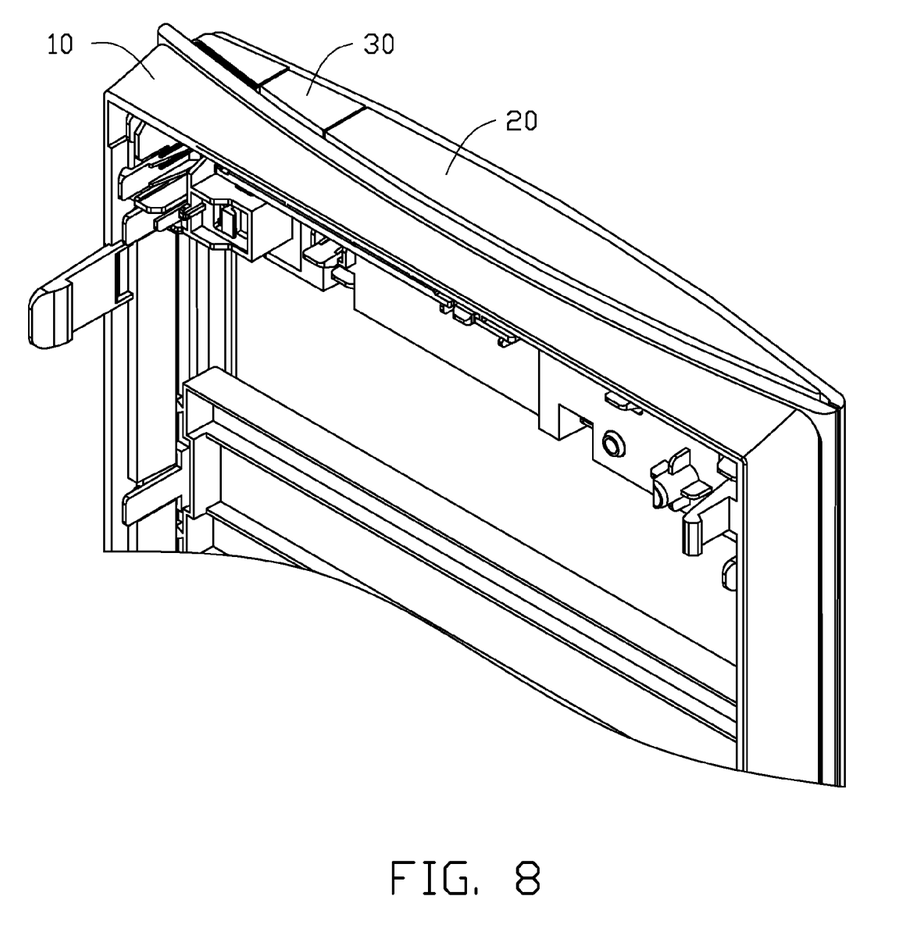
FIG. 8 is an assembled view of FIG. 2.

Referring to FIG. 8, in assembly of the computer enclosure, the light guide module 20 and the pressable member 30 are mounted in the holding slot 141. The pressing portion 32 is received in the gap 227 and is movable along a vertical direction in the gap 227. A free end of the resilient arm 34 is secured to the front panel 10. The transparent post 54 is mounted in the mounting hole 121. The main portion 52 is secured to an inner side of the front panel 10. The switch module 40 is secured to the inner side of the front panel 10 at a position where the first LED 80 faces the transparent post 54 and the second LED 90 faces the open end of the light guide module 20. The switch button 74 abuts a lower side of a corner of the resilient arm 34. After the pressing portion 32 is pressed, the resilient arm 34 is deformed and urges the switch button 74 to power on the computer. The first LED 80 is lit and generates light that enters the light guide slot 225 and comes through the first transparent board 24 and the second transparent board 26. The second LED 90 is also lit and generates light that emits from the transparent post 54 along the horizontal direction.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer enclosure comprising:
a front panel;
a switch module, attached to the front panel, comprising a mounting bracket, a switch member attached to the mounting bracket, and a light emitting diode (LED) attached to the mounting bracket; and
a light guide module, attached to the front panel, having a light guide slot and a first transparent board covering the light guide slot;
wherein the LED is configured to generate light that enters in the light guide slot and propagates out from the first transparent board when the switch member is turned on.

2. The computer enclosure of claim 1, wherein the light guide module further comprises a main shell, the main shell comprises a base plate and a pair of side plates connected to opposite sides of the base plate, and the light guide slot is located between the pair of side plates.

3. The computer enclosure of claim 2, wherein the main shell has a closed end and an open end, and an L-shaped gap is defined in each of the pair of side plates at the open end.

4. The computer enclosure of claim 3, wherein the light guide module further comprises a second transparent board, the second transparent board includes a main board and a flange extending perpendicularly from the main board, and the main board abuts the first transparent board, and the flange abuts an edge of the L-shaped gap.

5. The computer enclosure of claim 3, further comprising a pressable member abutting the switch member.

6. The computer enclosure of claim 5, wherein the pressable member comprises a pressing portion and a resilient arm connected to the pressing portion, the pressing portion is mounted in the L-shaped gap, and a free end of the resilient arm is secured to the front panel.

7. The computer enclosure of claim 6, wherein the resilient arm is L-shaped.

8. The computer enclosure of claim 1, wherein the front panel comprises a front plate and a top flange connected to the front plate, a holding slot is defined in the top flange, and the light guide module is mounted in the holding slot.

9. The computer enclosure of claim 8, further comprising a transparent member, a second LED is attached to the mounting bracket and configured to emit light that propagates out via the transparent member.

10. The computer enclosure of claim 9, wherein a mounting hole is defined in the front plate, the transparent member includes a main body secured to the front plate and a transparent post protruding from the main body, and the transparent post is mounted in the mounting hole to propagate light emitted by the second LED out from the front panel.

11. A computer enclosure comprising:
a front panel comprising a front plate and a top flange connected to the front plate, a holding slot being defined in the top flange;
a switch module, attached to the front panel, comprising a mounting bracket, a switch member attached to the mounting bracket, and a first light emitting diode (LED) attached to the mounting bracket; the first LED configured to generate light when the switch member is turned on; and
a light guide module, mounted in the holding slot, configured to propagate light emitted by the first LED out from the front panel.

12. The computer enclosure of claim 11, wherein the light guide module further comprises a main shell, the main shell comprises a base plate and a pair of side plates connected to opposite sides of the base plate, and a light guide slot is located between the pair of side plates.

13. The computer enclosure of claim 12, wherein the main shell has a closed end and an open end, and an L-shaped gap is defined in each of the pair of side plates at the open end.

14. The computer enclosure of claim 13, wherein the light guide module further comprises a second transparent board, the second transparent board includes a main board and a flange extending perpendicularly from the main board, and the main board abuts the first transparent board, and the flange abuts an edge of the L-shaped gap.

15. The computer enclosure of claim 13, further comprising a pressable member abutting the switch member.

16. The computer enclosure of claim 15, wherein the pressable member comprises a pressing portion and a resilient arm connected to the pressing portion, the pressing portion is mounted in the L-shaped gap, and a free end of the resilient arm is secured to the front panel.

17. The computer enclosure of claim 16, wherein the resilient arm is L-shaped.

18. The computer enclosure of claim 11, further comprising a transparent member, a second LED is attached to the mounting bracket and configured to emit light that propagates out via the transparent member.

19. The computer enclosure of claim 18, wherein a mounting hole is defined in the front plate, the transparent member includes a main body secured to the front plate and a transparent post protruding from the main body, and the transparent post is mounted in the mounting hole to propagate light emitted by the second LED out from the front panel.

* * * * *